United States Patent
Abbott et al.

(10) Patent No.: US 8,747,734 B2
(45) Date of Patent: *Jun. 10, 2014

(54) METAL PASSIVATION OF HEAT-EXCHANGER EXPOSED TO SYNTHESIS GAS

(75) Inventors: Peter Edward James Abbott, Eaglescliffe (GB); Martin Fowles, Whitby (GB)

(73) Assignee: Johnson Matthey PLC, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 13/821,882

(22) PCT Filed: Aug. 19, 2011

(86) PCT No.: PCT/GB2011/051575
§ 371 (c)(1),
(2), (4) Date: Jun. 3, 2013

(87) PCT Pub. No.: WO2012/032324
PCT Pub. Date: Mar. 15, 2012

(65) Prior Publication Data
US 2013/0248770 A1    Sep. 26, 2013

(30) Foreign Application Priority Data
Sep. 9, 2010 (GB) .................................. 1015022.5

(51) Int. Cl.
B01J 19/02 (2006.01)
C01B 3/02 (2006.01)
C23F 11/00 (2006.01)
F28F 19/02 (2006.01)

(52) U.S. Cl.
USPC ....... 422/7; 422/9; 422/10; 422/187; 252/387

(58) Field of Classification Search
USPC .............................. 422/7, 9, 10, 187; 252/387
See application file for complete search history.

(56) References Cited

U.S. PATENT DOCUMENTS

| 2,635,997 | A | * | 4/1953 | Rohrback et al. | 507/275 |
| 2,635,999 | A | * | 4/1953 | Rohrback et al. | 507/275 |
| 3,430,451 | A | * | 3/1969 | Dinshaw et al. | 62/85 |
| 4,910,228 | A |   | 3/1990 | Lywood |  |
| 5,425,857 | A |   | 6/1995 | Bouard et al. |  |
| 5,935,517 | A | * | 8/1999 | Roll et al. | 422/9 |
| 6,274,113 | B1 |  | 8/2001 | Heyse et al. |  |
| 7,727,509 | B2 | * | 6/2010 | Abbott et al. | 423/650 |

FOREIGN PATENT DOCUMENTS

| GB | 1 578 270 | 11/1980 |
| WO | WO-97/05947 A1 | 2/1997 |
| WO | WO-03/051771 A1 | 6/2003 |
| WO | WO-2007/049069 A1 | 5/2007 |

OTHER PUBLICATIONS

International Preliminary Report on Patentability from PCT International Application No. PCT/GB2011/051575. Mar. 2013.
International Search Report from PCT International Application No. PCT/GB2011/051575, dated Oct. 18, 2011.

* cited by examiner

Primary Examiner — Timothy Vanoy
(74) Attorney, Agent, or Firm — RatnerPrestia

(57) ABSTRACT

A process for passivation of surfaces of heat exchange apparatus exposed to a synthesis gas containing carbon monoxide, includes the steps of:
(i) adding arsine to the synthesis gas to provide a total As concentration in the synthesis gas in range 0.001 to 10 ppmv,
(ii) exposing the mixture of hot synthesis gas and arsine to the shell-side surfaces of said heat exchange apparatus to reduce the interaction between the carbon monoxide present in said gas and metals in said surfaces,
(iii) recovering a cooled synthesis gas from the shell-side of said apparatus, and
(iv) passing the cooled synthesis gas, optionally after further cooling, through a sorbent bed to remove arsenic compounds from the synthesis gas.

19 Claims, 2 Drawing Sheets

US 8,747,734 B2

METAL PASSIVATION OF HEAT-EXCHANGER EXPOSED TO SYNTHESIS GAS

CROSS-REFERENCE TO RELATED APPLICATIONS

This application is the U.S. National Phase application of PCT International Application No. PCT/GB2011/051575, filed Aug. 19, 2011, and claims priority of British Patent Application No. 1015022.5, filed Sep. 9, 2010, the disclosures of both of which are incorporated herein by reference in their entireties for all purposes.

FIELD OF THE INVENTION

This invention relates to methods for passivating metal surfaces in apparatus subjected to carbon monoxide-containing gases and in particular to methods for reducing methanation reactions, shift reactions and carburization reactions in heat exchange apparatus exposed to synthesis gases.

BACKGROUND OF THE INVENTION

Synthesis gases may be formed by steam reforming, partial oxidation, and/or a combination thereof. Thus, pre-reforming and autothermal reforming or primary steam reforming and autothermal or secondary reforming may be used to generate synthesis gases suitable for the production of methanol, dimethyl ether, hydrogen, and hydrocarbons by the Fischer-Tropsch reaction.

The synthesis gases recovered from the reforming apparatus may be cooled before downstream processing using various techniques. In one method, the hot secondary reformed gas mixture is passed through the shell side of a heat exchange reformer containing a plurality of catalyst filled tubes to provide the heat for the primary reforming step. The resulting partially cooled secondary reformed gas mixture may be subjected to one or more further stages of heat exchange. Alternatively the hot, reformed gas mixture may be fed to a waste heat boiler and then used to generate superheated steam before being cooled further in stages of heat exchange. Such heat exchange apparatus typically is fabricated using alloys that comprises metals such as Ni, Cr, and Fe, which under the conditions present in the apparatus, are able to interact with carbon monoxide in the synthesis gas to produce undesirable side reactions including methanation, water-gas shift, and the corrosive carburization reactions, which give rise to so-called "metal dusting." Whereas higher grade alloys may be used to reduce this problem, these can be costly to use in large reformers. Lower grade alloys may be used if their surfaces are passivated. Passivation of the metal surfaces in heat exchange equipment has been performed in an attempt to prevent the undesirable reactions from taking place.

WO 2007/049069 describes a method for passivating low-alloy steel surfaces in apparatus operating in the temperature range 350 to 580° C. and exposed to a carbon monoxide containing gas mixture comprising adding a passivating compound containing at least one phosphorus (P) atom to said gas mixture.

WO 03/051771 describes a method for reducing the interaction between carbon monoxide present in a heat exchange medium and metal surfaces on the shell side of heat exchange reformer apparatus used for producing a primary reformed gas by treatment of the shell-side of said apparatus with an effective amount of at least one passivation compound containing at least one atom selected from phosphorus, tin, antimony, arsenic, lead, bismuth, copper, germanium, silver, or gold.

Whereas the phosphorus compounds tested were effective in reducing the interaction of carbon monoxide with the alloy surfaces, there is a need to improve the passivation at higher temperatures and under more aggressive synthesis gas compositions.

SUMMARY OF THE INVENTION

Whereas the aforesaid WO 03/051771 suggests that certain arsenic compounds may be used, we have found that low levels of arsine, $AsH_3$, are particularly effective for the passivation. Moreover, in view of the severe poisoning effects of arsenic on downstream catalysts, it is necessary to use a sorbent to capture any arsenic that is not retained on the passivated surfaces.

Accordingly, the invention provides a process for the passivation of the surfaces of heat exchange apparatus exposed to a synthesis gas containing carbon monoxide, comprising the steps of:
  (i) adding arsine to the synthesis gas to provide a total As concentration in the synthesis gas in range 0.001 to 10 ppmv,
  (ii) exposing the mixture of hot synthesis gas and arsine to the shell-side surfaces of said heat exchange apparatus to reduce the interaction between the carbon monoxide present in said gas and metals in said surfaces,
  (iii) recovering a cooled synthesis gas from the shell-side of said apparatus, and
  (iv) passing the cooled synthesis gas, optionally after further cooling, through a sorbent bed to remove arsenic compounds from the synthesis gas.

The invention also provides apparatus suitable for performing the process.

BRIEF DESCRIPTION OF THE DRAWINGS

The invention will further be described by reference to the drawings, in which.

DETAILED DESCRIPTION OF THE INVENTION

Figure 1:
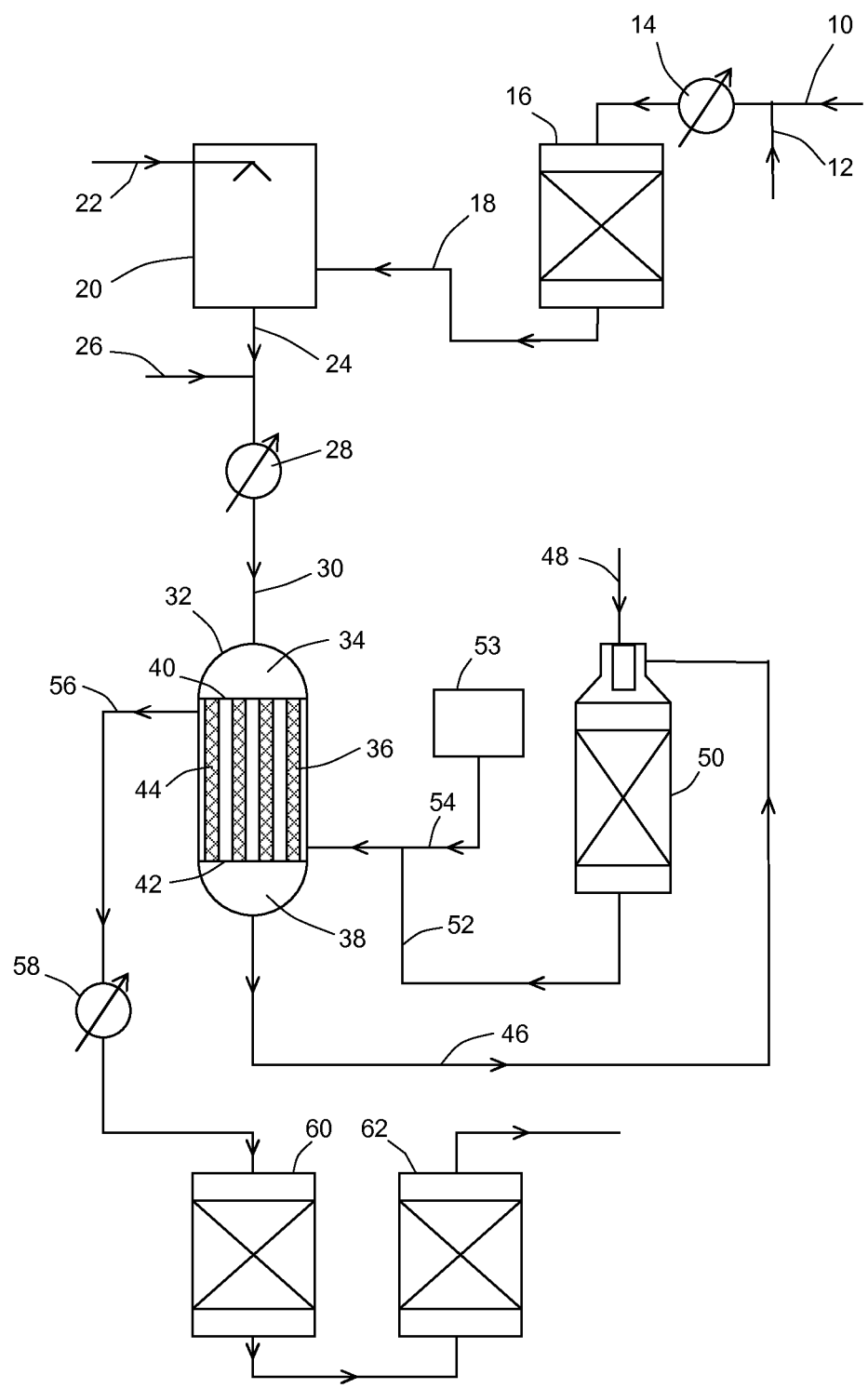
FIG. 1 depicts a process flow-sheet according to one embodiment of the present invention.

The heat exchange apparatus may be a steam generating heat exchange apparatus such as a waste heat boiler and/or steam superheater or a heat exchanger used to heat a fuel gas, hydrocarbon stream, or oxygen-containing gas used in the reforming process to generate the synthesis gas. In particular, steam superheaters and gas-gas-interchangers may be protected using the method of the present invention. Such heat exchange apparatus is well known and is typically installed downstream of conventional fired primary reformers and/or autothermal reformers.

In one embodiment, the passivation technique is applied to one or more heat exchangers, used to recover heat from a synthesis gas generated in a reforming process comprising subjecting a hydrocarbon feedstock/steam mixture to at least one stage of adiabatic steam reforming, also known as pre-reforming, over a supported nickel catalyst and passing the pre-reformed gas fed to an autothermal reformer where it is partially combusted with an oxygen-containing gas and the partially combusted gas passed through a bed of steam reforming catalyst.

Alternatively, the heat exchange apparatus may be a heat exchange reformer heated with a synthesis gas, also know as a gas-heated reformer. In such heat exchange reformer apparatus, a mixture of hydrocarbon and steam is passed from a process fluid feed zone, through vertical heat exchange tubes containing a particulate catalyst, disposed within a heat exchange zone defined by a shell through which a heat exchange medium passes, and then into a process fluid off-take zone. Gaseous heat exchange medium flows through the shell around the outside of the heat exchange tubes which may have sheath tubes surrounding them for a part of their length. Heat exchange reformers of this type are described in GB1578270 and WO97/05947. Another type of gas-heated heat exchange reformer apparatus that may be used is a double-tube heat exchange reformer as described in U.S. Pat. No. 4,910,228 wherein the reformer tubes each comprise an outer tube having a closed end and an inner tube disposed concentrically within the outer tube and communicating with the annular space between the inner and outer tubes at the closed end of the outer tube with the steam reforming catalyst disposed in said annular space. Heat exchange medium flows around the external surface of the outer tubes. In this embodiment, the heat exchange medium is a synthesis gas. In particular, the synthesis gas may be derived from a primary reformed gas mixture recovered from the catalyst-filled-tubes, which is then subjected to further processing in a secondary reformer. In the secondary reformer, the primary reformed gas is subjected to partial combustion with an oxygen containing gas in a burner, which raises its temperature, and the partially combusted gas passed through a bed of steam reforming catalyst, disposed beneath the burner.

The shell side of the heat exchange apparatus is taken to include all the surfaces within the shell of the apparatus that are exposed to the synthesis gas. This includes the inside of the shell and in particular the outer surfaces of tubes within the heat exchange apparatus. For example, in heat exchange reformer apparatus, the shell side includes the inner surface of the shell defining the heat exchange zone, the outer surfaces of heat exchange tubes, the outer surfaces of any fins attached to the heat exchange tubes to increase their heat transfer area, the surfaces of any sheath tubes surrounding the heat exchange tubes, the surfaces of any tube-sheets defining the boundaries of said heat exchange zone and which are exposed to heat exchange medium and the outer surfaces of any header pipes within said heat exchange zone.

The method of the present invention requires the treatment of the shell side of heat exchange apparatus. By treatment we mean coating of the metal surfaces on the shell side of the heat exchange apparatus with arsine and any other compounds that may be added to improve the effectiveness of the passivation compounds, herein termed augmenting compounds. Because of the high temperatures within heat exchange apparatus in use, the arsine and any augmenting compounds may undergo a thermal transformation resulting in the formation of one or more passivation species that reduce the interaction between carbon monoxide present in the synthesis gas and catalytically active metals on the shell side of the heat exchange apparatus. The passivation species in this case may comprise arsine and As vapor.

The synthesis gas that is contacted with the arsine may be at a temperature $\geq 500°$ C., preferably $\geq 600°$ C., and more preferably $\geq 650°$ C. The arsenic passivation species formed reduces the interaction between the carbon monoxide present in said synthesis gas and the catalytically-active metals on the shell side of the heat exchange apparatus.

The arsenic passivation species may be formed by adding arsine neat or diluted in an inert gas such as nitrogen, to the synthesis gas. Suitable concentrations of arsine in inert gas may be in the range 0.1 to 10% by volume.

The arsine may be sourced commercially of may be generated local to the heat exchange apparatus from arsenic materials using known methods. Arsine may be generated electrochemically. For example, an arsenic cathode immersed in a potassium hydroxide electrolyte may be reduced to form arsine. Alternatively, a method, described in U.S. Pat. No. 5,425,857 uses an electrochemical cell having a cathode supplied with $H^+$ and $AsO_2^-$ ions that produces a mixture of arsine and gaseous hydrogen. Preferably, the source of $AsO_2^-$ ions is $As_2O_3$, which is reacted with water to form $HAsO_2$. The product gas stream comprising hydrogen and arsine may be compressed and combined with the synthesis gas. Hydrogen is acceptable as an impurity because the reformed gas already contains a high concentration of hydrogen. Alternatively, the hydrogen may be separated from the mixture by means of a suitable membrane such as a polyimide or polyaramide, and the hydrogen-rich stream used as a fuel. Oxygen is produced at the anode, which may be vented, combined with combustion air used in heat or power generation or used to supplement the oxygen stream used in reforming. An alternative to electrochemical generation of arsine uses arsine trapped within pores of zeolites or carbon materials. Another alternative method uses the controlled reaction of water with potassium arsenide, which releases arsine at low pressure.

The generation of arsine is desirably local, i.e. adjacent, the heat exchange apparatus.

Augmenting compounds may optionally be added with arsine in order to improve the ability of the arsine passivation species to reduce side reactions. Augmenting compounds preferably contain at least one atom selected from phosphorus, tin, antimony, lead, bismuth, copper, germanium, silver or gold, aluminium, gallium, chromium, indium, or titanium. Suitable augmenting compounds include inorganic compounds comprising oxides and oxo compounds, including hydrous oxides, oxo-acids and hydroxides, sulphides, sulphates, sulphites, phosphates, phosphites, carbonates, or nitrates and metal-organic compounds, comprising metal carboxylates, thiocarboxylates, or carbamates, metal alkyl- or arylsulphonates, metal alkyl- or arylphosphates esters, metal alkyl- or arylphosphonates or thiophosphonates, metal alkyls, metal aryls, metal alkoxides and aryloxides, and chelated compounds.

In the present invention, the treatment of the shell side of the heat exchange apparatus is by addition of arsine and any augmenting compound, if used, to the synthesis gas. This addition may be continuous or periodic. It is preferable, when addition is continuous, that the addition rate is such that the temperature of the synthesis gas is not reduced by more that 10 degrees centigrade, in order not to impact on the performance of the heat exchange apparatus. Alternatively where the addition of passivation compound is periodic, a greater temporary reduction in temperature of the synthesis gas may be tolerated.

The concentration of arsenic (As) present in the synthesis gas is in the range 0.001-10 ppmv, preferably 0.01 to 1 ppmv, more preferably 0.02-0.2 ppmv. This is considerably lower than the phosphorus levels required in the aforesaid WO 03/05771. If a phosphorus, aluminium, gallium, chromium, indium, or titanium-containing augmenting compound is also used, these elements are desirably present in the synthesis gas at a level between 0.01 and 10 ppm by volume.

It has been found that beneficial effects are observed where the shell side of the heat exchanger apparatus is subjected to a pre-treatment with arsine in an inert gas stream at a temperature ≥500° C. The pre-treatment may reduce the amount of arsenic required to be added with the synthesis gas. Suitable inert gases are methane, carbon dioxide, and especially nitrogen. The As concentration in the inert gas is preferably in the range 0.001 to 10 ppmv, preferably 0.01 to 1 ppmv, more preferably 0.02-0.2 ppmv.

The shell side of the heat exchange apparatus may be treated by either a continual or periodic addition of arsine and any augmenting compound to the synthesis gas. Continual low-level addition may be preferable to periodic higher level addition in preventing the undesired side reactions.

Because arsenic species are potent catalyst poisons capable of deactivating catalysts in subsequent process steps, the present invention provides means downstream of the heat exchange apparatus to recover the volatile arsenic species to prevent contamination of subsequent processes or poisoning of catalysts in any subsequent process steps. Such apparatus may comprise a fixed bed of a particulate sorbent material or monolithic sorbent structures arranged in a suitable vessel. The sorbent may be applied to the synthesis gas at high temperature, typically ≥200° C., or at a lower temperature, typically ≤200° C., optionally after removal of any process condensate. Suitable sorbents for arsenic species include supported precious metal sorbents, such as supported Pd compositions, and copper-, iron-, and/or manganese-compounds. The means to recover volatile arsenic species preferably comprises a copper-containing sorbent. In particular, copper compounds such as copper oxide and basic copper carbonate, which may be combined with one or more supports and/or binder materials, have been found to be particularly effective for trapping arsenic. Under the reducing conditions provided by the synthesis gas, the copper in the sorbent may be reduced to an elemental state in situ. A particularly suitable copper-containing sorbent is PURASPEC™ 2088 available from Johnson Matthey Catalysts.

In order that the copper-containing sorbent does not promote undesired side reactions, it is preferable to cool the synthesis gas exiting the heat exchange apparatus to ≤200° C., preferably ≤150° C., and remove any process condensate that may have formed before passing the synthesis gas over the sorbent to remove the As. Any As in the condensate may be removed using suitable materials such as sieves or ion-exchange resins.

Effective treatment of the shell side of apparatus according to the method of the present invention results in a reduction of the undesirable carbon monoxide reactions that can occur. The reduction may be observed by monitoring the methane and/or carbon dioxide levels in the synthesis gas pre- and post-treatment. The reduction in methane and carbon dioxide that may be achieved depends on the quantity and nature of the passivation compounds, the fabrication alloy of the heat exchange medium, as well as the method of treatment of the heat exchange apparatus and the carbon monoxide content of the synthesis gas. Typically, reductions in the range 5-100% of methane and/or carbon dioxide content may be observed.

In FIG. 1, natural gas at an elevated pressure, typically in the range 15 to 50 bar abs., is fed via line 10 and mixed with a small amount of a hydrogen-containing gas fed via line 12. The mixture is then heated in heat exchanger 14 and fed to a desulphurisation stage 16 wherein the gas mixture is contacted with a bed of a hydro-desulphurisation catalyst, such as nickel or cobalt molybdate, and an absorbent, such as zinc oxide, for hydrogen sulphide removal. The desulphurised gas mixture is then fed, via line 18, to a saturator 20, wherein the gas contacts a stream of heated water supplied via line 22. The saturated gas leaves the saturator via line 24 and may if desired be subjected to a step of low temperature adiabatic reforming (not shown) before being mixed with recycled carbon dioxide supplied via line 26 and heated in heat exchanger 28 to a heat exchange reformer inlet temperature. The heated process gas is fed from exchanger 28, via line 30, to the catalyst-containing tubes of a heat exchange reformer 32. The heat exchange reformer has a process fluid feed zone 34, a heat exchange zone 36, a process fluid off-take zone 38, and first 40 and second 42 boundary means separating said zones from one another. The process fluid is subjected to steam reforming in a plurality of heat exchange tubes 44 containing a steam reforming catalyst to give a primary reformed gas stream. Only 4 tubes are shown; it will be well understood by those skilled in the art that in practice there may be tens or hundreds of such tubes. The primary reformed gas stream is passed from said heat exchange tubes 44 to the process fluid off-take zone 38, and then via line 46 to further processing. The further processing comprises secondary reforming in an autothermal reformer 50 in which the primary reformed gas mixture is subjected to partial combustion with an oxygen-containing gas, supplied via line 48 to a burner disposed above a bed of secondary reforming catalyst. The resultant secondary reformed synthesis gas is passed via line 52 to heat exchange zone 36 as the heat exchange medium.

Passivation compound feed apparatus 53 feeds an arsine/nitrogen gas mixture via line 54 to the secondary reformed synthesis gas in line 52 in order to disperse an arsenic species effective for passivation within the synthesis gas. The passivation compound feed apparatus preferably comprises a tube, fed by a suitable metering pump from a reservoir of arsine, inserted into the synthesis gas feed line. The tube typically may have a nozzle having a plurality of small holes so that the arsine is introduced in a form that is readily dispersed. The feed apparatus controls the flow of arsine such that the As concentration in the synthesis gas is in the range 0.001-1 ppmv prior to entry to the heat exchange zone 36.

The synthesis gas containing the arsenic passivation species passes up through the spaces between the heat-exchange tubes thereby supplying the heat required for the primary reforming and exits the reactor as a partially-cooled synthesis gas via line 56. The arsenic passivation species are deposited upon the outer surfaces of the heat exchange tubes 44 and other surfaces within the shell side of the heat exchange zone 36. The reformed gas in line 56 is then cooled in one or more heat exchangers 58, including one or more waste heat boilers, steam superheaters and gas-gas-interchangers.

Any volatile arsenic compounds passing through the shell side of the heat exchange reformer 32 are removed by passing the cooled reformed gas after cooling to below 200° C. and removal of condensate (not shown) through a reduced copper-sorbent disposed in vessels 60 and 62. These vessels may be arranged such that when the beds within 60 become saturated, the reformed gas is fed directly to vessel 62 and vessel 60 is taken off-line and replenished with fresh sorbent. When vessel 60 has been replenished, it is re-introduced into the process line as the downstream vessel in readiness for when the beds in vessel 62 become saturated.

Figure 2:
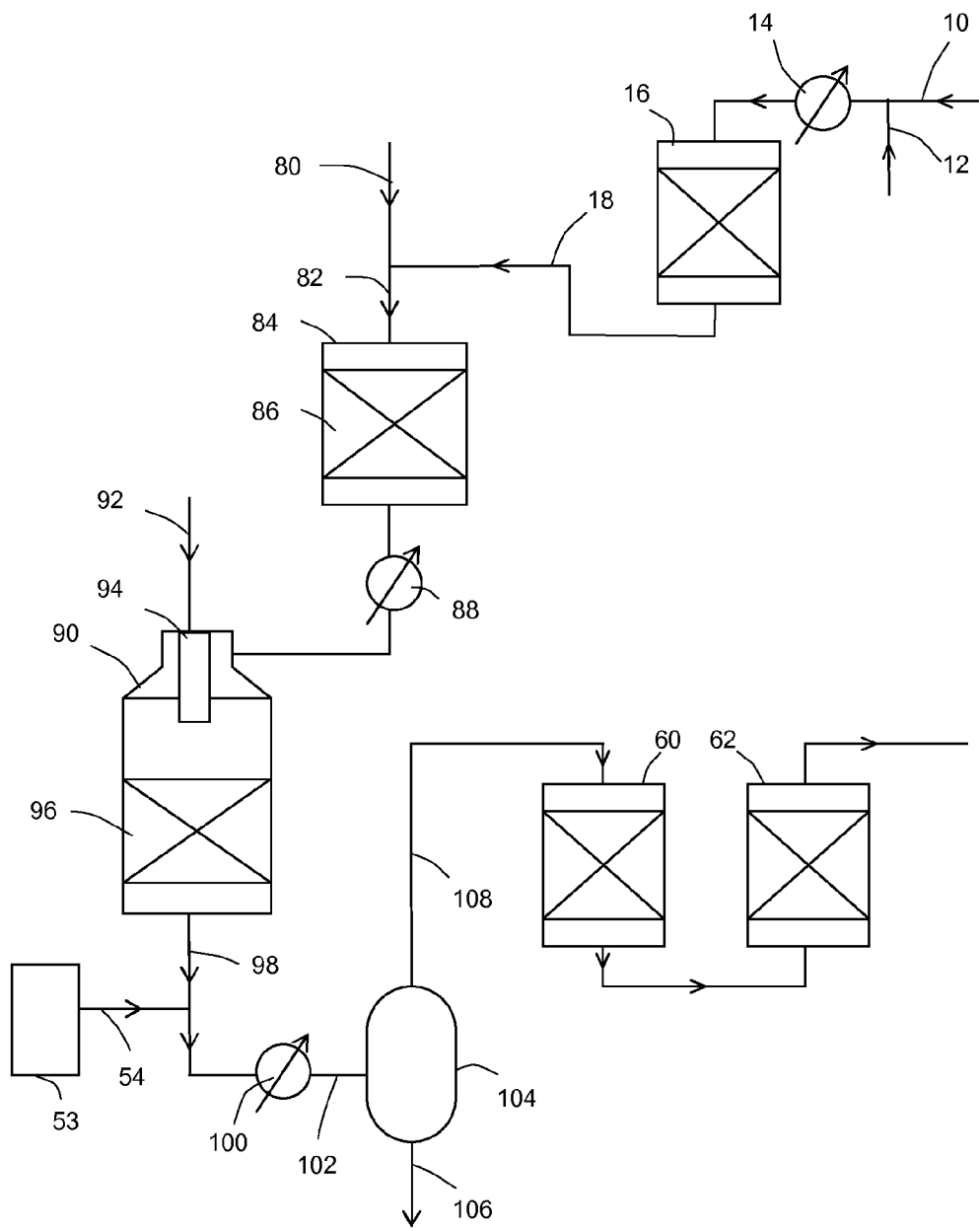
FIG. 2 depicts a process flow-sheet incorporating an alternative embodiment of the present invention.

In FIG. 2, natural gas at an elevated pressure, typically in the range 15 to 50 bar abs., is fed via line 10 and mixed with a small amount of a hydrogen-containing gas fed via line 12. The mixture is heated in heat exchanger 14 and fed to a desulphurisation stage 16 wherein the gas mixture is contacted with a bed of a hydro-desulphurisation catalyst, such as nickel or cobalt molybdate, and an absorbent, such as zinc oxide, to remove hydrogen sulphide. The desulphurised gas mixture from the HDS unit 16 in line 18 is mixed with steam in line 80 and the resulting desulphurised natural gas/steam mixture 82 subjected to a step of adiabatic low temperature reforming in pre-reformer 84 containing a bed of pre-reforming catalyst 86. In the pre-reforming stage, the desulphurised natural gas/steam mixture is heated to a temperature in the range 350-650° C., preferably 400-650° C., and passed adiabatically through a bed of a supported nickel catalyst. During such an adiabatic low temperature reforming step, any hydrocarbons higher than methane react with steam to give a mixture of methane, carbon oxides, and hydrogen. After the pre-reforming step, the pre-reformed gas mixture is heated, in heat exchanger 88 and fed to an autothermal reformer 90. In the autothermal reformer, the pre-reformed gas, which may be mixed with a recovered carbon dioxide stream and/or tail gas from downstream processing, is first subjected to a step of partial combustion with an oxygen containing gas fed via line 92 in burner 94. Whereas some steam may be added to the oxygen containing gas, preferably the amount is minimised so that a low overall steam ratio for the reforming process is achieved. The gas containing free oxygen is preferably substantially pure oxygen, e.g. oxygen containing less than 5% nitrogen. However where the presence of substantial amounts of inerts is permissible, the gas containing free oxygen may be air or enriched air. Where the gas containing free oxygen is substantially pure oxygen, for metallurgical reasons it is preferably fed to the autothermal reformer at a temperature below about 250° C.

The amount of oxygen fed to the partial combustion stage may be varied to effect the composition of the reformed gas mixture. The amount of oxygen-containing gas added is preferably such that 40 to 70, preferably 40 to 60 moles of oxygen are added per 100 gram atoms of carbon in the hydrocarbon feedstock. The partial combustion reactions may raise the gas temperature of the gas mixture to between 1000 and 1700° C.

The hot partially combusted gas then passes though a fixed bed of steam reforming catalyst 96 disposed beneath the burner 94 in the autothermal reformer 90 to form the synthesis gas mixture. The steam reforming catalyst may be nickel and/or ruthenium supported on a refractory support such as rings or pellets of calcium aluminate cement, alumina, titania, zirconia, and the like. The partially combusted gas is cooled as it passes through the bed of steam reforming catalyst. As stated above, the temperature of the reformed gas may be controlled by the amount of oxygen added for the partial combustion step. Preferably the amount of oxygen added is such that the autothermally reformed synthesis gas mixture leaves the steam reforming catalyst at a temperature in the range 850-1050° C. The hot synthesis gas is recovered from the autothermal reformer via line 98.

Passivation compound feed apparatus 53 feeds an arsine/nitrogen gas mixture via line 54 to the autothermally reformed synthesis gas in line 98 in order to disperse an arsenic species effective for passivation within the synthesis gas at an As concentration in the range 0.001-1 ppmv.

The synthesis gas/As species mixture then passes to one or more heat exchangers including one or more waste heat boilers, steam superheaters and gas-gas-interchangers 100. The undesired side reactions between carbon monoxide and the alloys used in the shell side of the waste heat boiler are prevented or reduced by the arsenic passivation species present in the synthesis gas mixture.

The cooled synthesis gas mixture is cooled to below the dew point of steam at which water condenses. The cooled synthesis gas is fed via line 102 to a separator 104, which separates process condensate via line 106. The resulting dewatered synthesis gas contains volatile arsenic species and so is fed from the separator 104 via line 108 to sorbent vessels 60 and 62 containing a suitable copper-based sorbent that removes arsenic compounds from the synthesis gas.

EXAMPLES

The invention will be further described by way of the following examples.

Example 1

Comparison of P and As

In a calculated example, the vapor pressure and loss of volatile species from intermetallic nickel-arsenic alloys under conditions typical in the shell side of a heat exchange reformer were determined. The results may be compared with phosphorus intermetallic compounds as follows;

| Element | P | As |
|---|---|---|
| Intermetallic | $Ni_5P_2$ | $Ni_5As_2$ |
| Volatile Species | $P_4O_6$ | $AsH_3$ |
| 900K (Vapor pressure atm) | $2.50 \times 10^{-10}$ | $2.00 \times 10^{-10}$ |
| Loss g (element)/hr | $1.21 \times 10^{-3}$ | $5.85 \times 10^{-4}$ |
| Loss 1000 hrs (g) | $1.21 \times 10^{0}$ | $5.85 \times 10^{-1}$ |
| 1000K (Vapor pressure atm) | $3.00 \times 10^{-9}$ | $1.90 \times 10^{-9}$ |
| Loss g (element)/hr | $1.45 \times 10^{-2}$ | $5.56 \times 10^{-3}$ |
| Loss 1000 hrs (g) | $1.45 \times 10^{1}$ | $5.56 \times 10^{0}$ |

The calculations assume $p(H_2O)=9.3$ atm, $p(H_2)=20.9$ atm and flowrate of heat exchange medium is 1560 kmol per hour. The intermetallic cited is the most stable species under the conditions. The calculations show As-compounds to be more effective than P-compounds in producing a stable intermetallic alloy with Ni that will suppress carbon monoxide reactions and remain relatively involatile compared to phosphorus under typical operating conditions.

Example 2

Effect of $AsH_3$ on Alloy 601

The activity of Alloy 601 in a synthesis gas with significant potential to cause metal dusting was determined by placing test pieces in a quartz tube, which was inert with respect to the synthesis gas composition used for the test, and exposing the test pieces to the gas over a range of temperatures. The reactions were monitored by measuring the concentrations of methane and carbon dioxide in the gas downstream of the test apparatus using an IR analyser.

a) 77 test pieces (ca 2×2×2 mm) of fresh Alloy were exposed to a synthesis gas mixture known to cause metal dusting on untreated alloy 601, but with a small addition of arsine in nitrogen (reduction coefficient=0.023, Boudouard coefficient=0.015) at 1.8 mols/hr at 39 bar abs.

The gas composition was as follows;

| | |
|---|---|
| $H_2$ | 54.3% volume |
| CO | 27.1% |
| $CO_2$ | 4.3% |

-continued

| | |
|---|---|
| H₂O | 13.2% |
| N₂ | 1.1% |
| CH₄ | 0.0% |

There was no reactivity towards the carbon monoxide in the synthesis gas evident during treatment with 0.05 ppmv AsH₃ over 6 weeks at operating conditions between 500° C. and 825° C., with a final 10-day period at 750° C. without any AsH₃ addition.

b) 23 test pieces (ca 2×2×2 mm) of alloy 601 were exposed to a synthesis gas mixture (reduction coefficient 0.025, Boudouard coefficient 0.016) at 1.8 mols/hr at 675° C. and 39 bar abs.

The gas composition was as follows;

| | |
|---|---|
| H₂ | 48.9% volume |
| CO | 24.3% |
| CO₂ | 3.9% |
| H₂O | 11.9% |
| N₂ | 11.0% |
| CH₄ | 0.0% |

Over an initial period of 1340 minutes, the material showed reaction with CO, as evidenced by increase in the methane content and corrosion by metal dusting. At 1340 minutes a flow of 5 ppmv AsH₃ in nitrogen (equivalent to 0.55 ppmv AsH₃ in the resulting synthesis gas mixture) was started. The methanation reactions producing methane were reduced by about 50%. The flow of synthesis gas was stopped and the test pieces subjected to passivation with the arsine/nitrogen gas mixture at 0.7 ppmv for ca. 4000 minutes at 675° C. Upon re-introduction of the synthesis gas, and maintaining the AsH3 at 0.5 ppmv, from about 6000 minutes gas no methanation was observed. The AsH₃ content of the syngas was then reduced to zero over the following 1400 minutes with no resumption of the methanation reaction to the end of the experiment (9000 minutes).

The results show that addition of AsH₃ in nitrogen reduced and then stopped the methanation reactions completely and prevented further deterioration of the test pieces. Spectroscopic examination showed the As to be preferentially associated with probable metal dusting features on the metal surface.

The invention claimed is:

1. A process for the passivation of the surfaces of heat exchange apparatus exposed to a synthesis gas containing carbon monoxide, comprising the steps of:
   (i) generating arsine in arsine generation apparatus,
   (ii) adding the arsine to the synthesis gas to provide a total as concentration in the synthesis gas in range 0.001 to 10 ppmv,
   (iii) exposing the mixture of hot synthesis gas and arsine to the shell-side surfaces of said heat exchange apparatus to reduce the interaction between the carbon monoxide present in said gas and metals said in said surfaces,
   (iv) recovering a cooled synthesis gas from the shell-side of said apparatus, and
   (v) passing the cooled synthesis gas, optionally after further cooling, through a sorbent bed to remove arsenic compounds from the synthesis gas.

2. A process according to claim 1 wherein the heat exchange apparatus comprises steam generating heat exchange apparatus and/or a gas-gas interchanger.

3. A process according to claim 1 wherein the heat exchange apparatus comprises a heat exchange reformer used to generate a primary reformed gas mixture.

4. A process according to claim 3 wherein the primary reformed gas mixture is subjected to partial oxidation with an oxygen containing gas and secondary reforming to generate the synthesis gas.

5. A process according to claim 1 wherein the As content in the synthesis gas is in the range 0.01 to 1 ppmv.

6. A process according to claim 1 wherein the arsine is added continuously or periodically.

7. A process according to claim 1 wherein the shell side of the heat exchanger apparatus is subjected to a pre-treatment with arsine in an inert gas stream at a temperature ≥500° C.

8. A process according to claim 7 wherein the inert gas is nitrogen.

9. A process according to claim 1 wherein arsine is generated electrochemically, by desorbing arsine from porous carbon or zeolite materials or by reacting water with potassium arsenide.

10. A process according to claim 1 wherein one or more augmenting compounds containing at least one augmenting atom selected from the group consisting of phosphorus, tin, antimony, lead, bismuth, copper, germanium, silver, gold, aluminium, gallium, chromium, indium, and titanium is combined with the synthesis gas.

11. A process according to claim 10 wherein the augmenting atom is present in the synthesis gas at a level between 0.01 and 10 ppm by volume.

12. A process according to claim 1 wherein the sorbent is a supported precious metal or copper-containing sorbent.

13. Apparatus comprising
   (i) heat exchange apparatus containing a shell side having surfaces reactive with carbon monoxide present in a synthesis gas passed through the shell side of said apparatus,
   (ii) arsine generation apparatus for generating arsine,
   (iii) means for adding the arsine to the synthesis gas such that the concentration of As in the synthesis gas is in the range 0.001-10 ppmv,
   (iv) means for recovering a cooled synthesis gas from the shell-side of said apparatus, and
   (v) a sorbent vessel, coupled to said heat exchange apparatus, though which the cooled synthesis gas, optionally after further cooling, is passed, said vessel containing a sorbent bed to remove arsenic compounds from the synthesis gas.

14. Apparatus according to claim 13 wherein the heat exchange apparatus comprises steam generating heat exchange apparatus and/or a gas-gas interchanger.

15. Apparatus according to claim 13 wherein the heat exchange apparatus comprises a heat exchange reformer used to generate a primary reformed gas mixture.

16. Apparatus according to claim 15 further comprising a secondary reformer to which the primary reformed gas is connected, said secondary reformer comprising a burner for partial oxidation of said primary reformed gas with an oxygen containing gas to generate a partially oxidised gas mixture, and bed of secondary reforming catalyst disposed beneath the burner through which the partially oxidised gas mixture is passed to generate the synthesis gas.

17. Apparatus according to claim 13 wherein the arsine generation apparatus comprises an electrochemical cell in which arsine is generated electrochemically, or a vessel in which arsine is desorbed from porous carbon or zeolite materials, or a vessel in which water is reacted with potassium arsenide to produce arsine.

18. Apparatus according to claim 13 wherein the sorbent is a supported precious metal or copper-containing sorbent.

19. Apparatus according to claim 18 wherein the copper-containing sorbent is a particulate copper/zinc oxide/alumina composition.

* * * * *